United States Patent [19]

Abrams et al.

[11] 4,353,435
[45] Oct. 12, 1982

[54] WIDE FLOW-RANGE LUBRICANT DISTRIBUTOR

[75] Inventors: Abraham Abrams, Roslyn Heights; John J. Baumann, Medford, both of N.Y.

[73] Assignee: Uniwave, Inc., Farmingdale, N.Y.

[21] Appl. No.: 157,601

[22] Filed: Jun. 16, 1980

Related U.S. Application Data

[63] Continuation-in-part of Ser. No. 60,423, Jul. 25, 1979, abandoned.

[51] Int. Cl.³ ............................................. F01M 1/16
[52] U.S. Cl. ................................ 184/6.26; 184/55 A; 239/338; 239/553.5
[58] Field of Search ...................... 184/6.26, 7 R, 7 A, 184/55 R, 55 A, 56 R; 239/553, 553.5, 553.3, 338

[56] References Cited

U.S. PATENT DOCUMENTS

| | | | |
|---|---|---|---|
| 2,227,278 | 12/1940 | Slater | 184/55 A |
| 2,245,600 | 6/1941 | Medsker | 184/55 A |
| 2,245,601 | 6/1941 | Medsker | 184/55 A |
| 2,826,454 | 3/1958 | Coanda | 239/338 |
| 2,906,463 | 9/1959 | Curry | 239/338 |
| 3,481,431 | 12/1969 | Dorsey | 239/338 X |
| 3,580,249 | 5/1971 | Takaoka | 239/338 X |
| 3,838,686 | 10/1974 | Szekely | 239/338 X |
| 3,871,484 | 3/1975 | Thomas | 184/6.26 |
| 3,939,944 | 2/1976 | Mitchell et al. | 184/6.26 |
| 4,284,243 | 8/1981 | Shaner | 239/553.5 |

*Primary Examiner*—David H. Brown
*Attorney, Agent, or Firm*—Blum, Kaplan, Friedman, Silberman & Beran

[57] ABSTRACT

A distributor for feeding a lubricant to lubrication tubes is provided. A pressurized lubricant stream is projected from an outlet across a gap and impinges at least in part on an inlet of a lubrication tube positioned to face the stream. The lubrication tube is supported so as to limit interference of flow into its inlet by excess lubricant from the stream not impinging on the inlet. The lubricant stream may be in the form of an essentially conical stream diverging from the outlet, two lubrication tubes positioned with their respective inlets in essentially uniform spacing from the outlet and from the axis of the conical stream receiving essentially uniform quantities of lubricant. The lubrication stream may be a pressurized air-oil stream.

41 Claims, 15 Drawing Figures

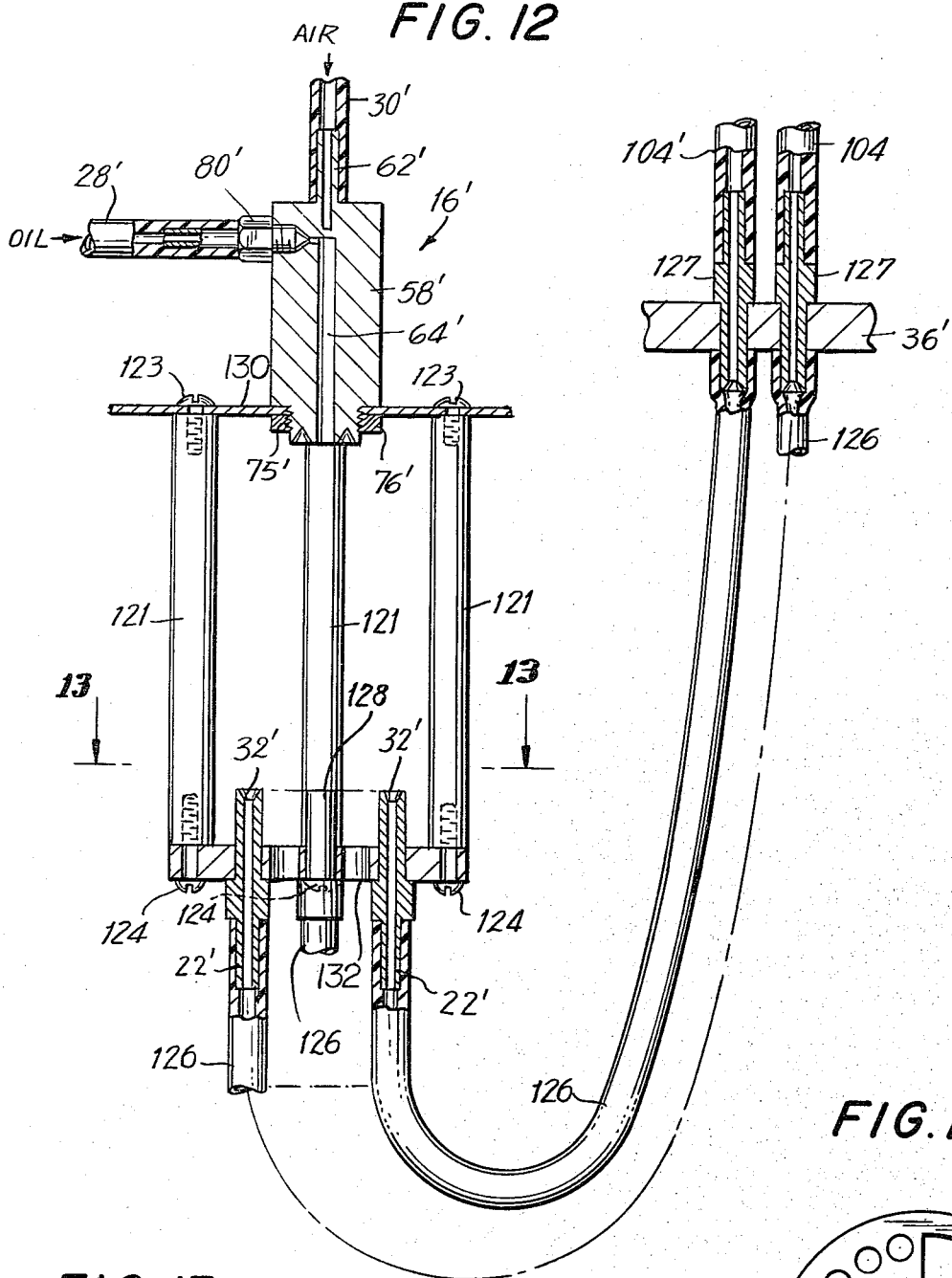
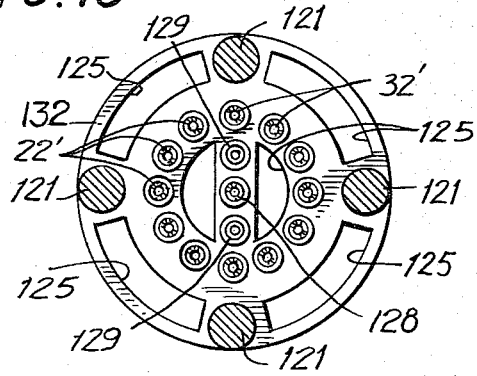
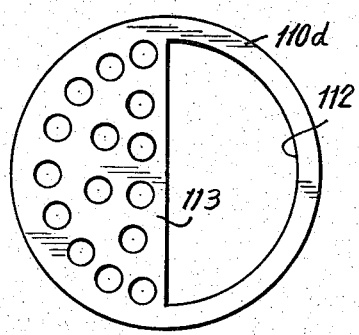

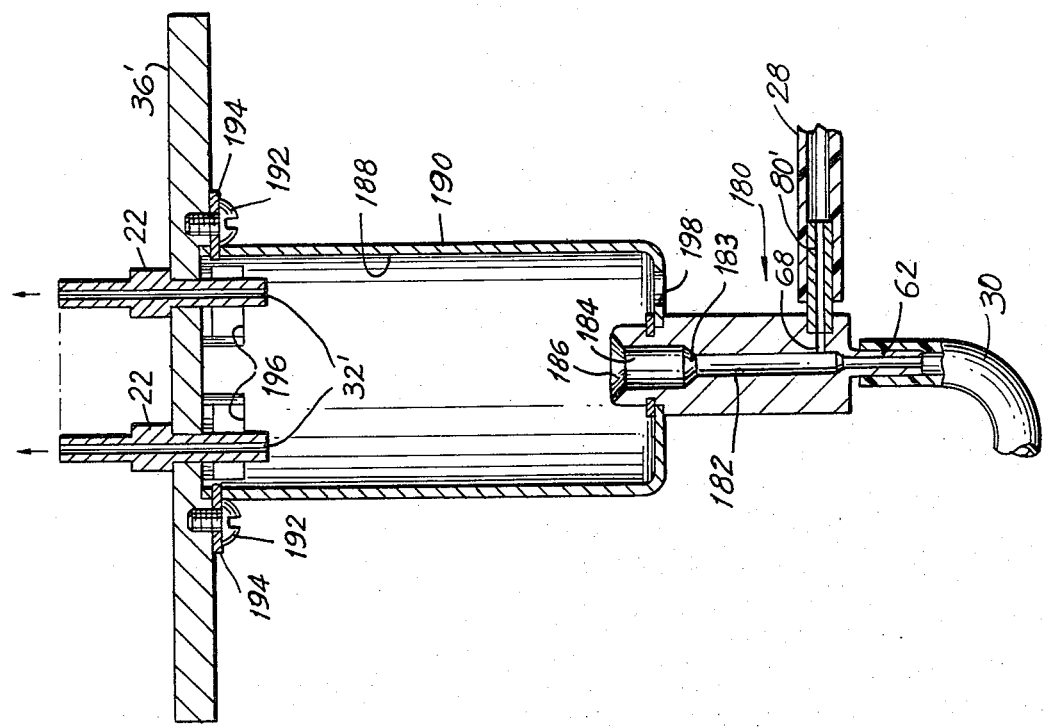
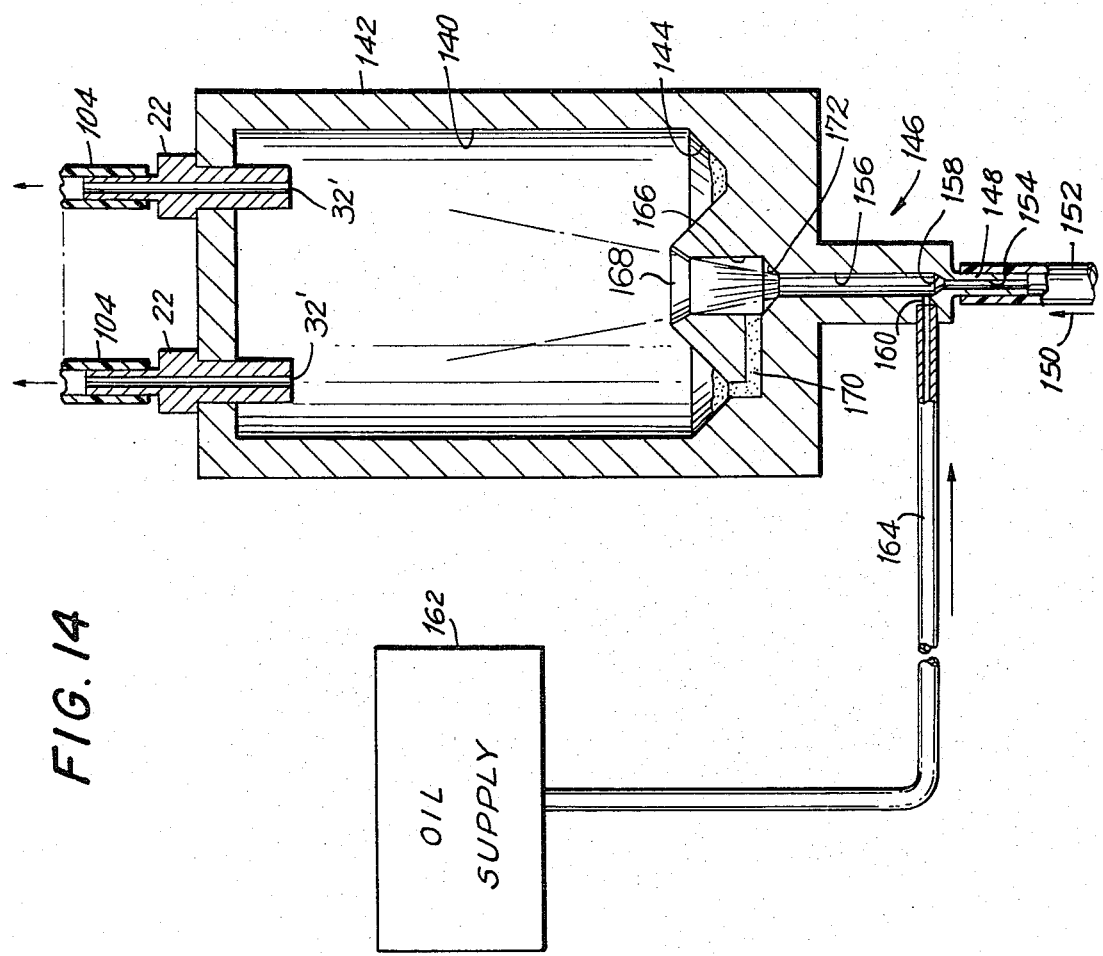

WIDE FLOW-RANGE LUBRICANT DISTRIBUTOR

CROSS-REFERENCE TO RELATED APPLICATION

This is a continuation-in-part of our application Ser. No. 06/060,423, filed July 25, 1979, now abandoned.

BACKGROUND OF THE INVENTION

This invention relates generally to a lubrication distributor of the type used to transport a lubricant, such as oil, to a plurality of points requiring lubrication. More particularly, the invention relates to an oil distributor which provides a wide range of flow rates of oil to complex machinery such as knitting machinery.

In the past, lubrication of equipment such as knitting machinery has been accomplished by the user of mist-oil lubrication systems. In such lubrication systems, lubricating oil is suspended as an aerosol in a stream of air and is carried in this state through a tube or other enclosed channel to a remote location requiring continuous lubrication. The oil is generally placed in the aerosol state at a central oil-mist source, each central oil-mist source being connected to a plurality of transmitting tubes for the simultaneous and continuous lubrication of a plurality of locations on a single machine or group of machines. The aerosol or oil fog is created by a venturi, large droplets being removed from the air-oil stream by impinging the stream against a baffle. The fog remaining in a chamber or manifold is carried to the point of lubrication by the flow of the air portion of the stream.

The known mist-oil lubrication systems, while producing satisfactory lubrication, have proved deficient in several respects, namely, the range of oil volume deliverable to lubrication points is limited, and uniform delivery of oil to a plurality of points over a range of volumes has proved difficult.

What is needed is a lubrication system that distributes a wider range of volumes of lubricant uniformly to a plurality of points for lubrication.

SUMMARY OF THE INVENTION

Generally speaking, in accordance with the invention, a distributor for feeding a lubricant is provided including lubricant supply means having an outlet, lubricant transmission means having an inlet spaced from said outlet by a gap, said lubricant supply means being adapted to project a pressurized lubricant stream from said outlet across said gap, and means supporting said lubricant transmission means inlet so that said transmission means inlet faces and is at least in part in the path of at least a portion of the lubricant stream, so that interference by lubricant from said stream not directly impinging on said lubricant transmission means inlet of the flow of lubricant into said inlet is substantially limited.

Specifically, the flow of excess lubricant into said lubricant transmission means inlet is essentially prevented. Such prevention may be achieved by providing paths for the run-off of excess lubricant and by positioning the inlet so that it projects from the support thereof. Where two or more lubricant transmission means are provided, the supporting means can position the inlets thereof so as to be in the path of equivalent portions of the lubricant stream, so that essentially uniform flow is created in said lubrication transmission means.

Said lubricant supply means may be adapted to produce an essentially conical lubricant stream, two lubrication transmission means inlets positioned in essentially uniform spacing from said outlet and from the axis of the conical stream receiving essentially uniform quantities of lubricant. The lubrication stream may be a pressurized air-oil stream. Means may be provided for selectively varying the volume of lubricant in the stream for selective variation of the volume of lubricant flowing into said lubrication transmission means inlets.

The excess lubricant from said lubricant stream not entering said lubrication transmission means inlets may be returned to a reservoir forming a part of the lubricant supply means. In an alternative embodiment, the excess lubricant is fed directly to the lubricant stream forming portion of the lubricant transmission means and not returned to the reservoir.

Accordingly, it is an object of this invention to provide an improved lubricant distributor which delivers oil fog and a series of droplets of different micron size propelled by air to a plurality of remote points requiring lubrication.

Another object of this invention is to provide an improved lubricant distributor which delivers lubricant at rates which are variable over a wide range of flow.

A further object of this invention is to provide an improved lubricant distributor which provides auxiliary supplies of lubricant delivered at rates differing from the rates in the primary delivery system.

Still another object of this invention is to provide an improved lubricant distributor which provides substantially equal quantities of lubricant simultaneously to a plurality of remote points.

A further object of this invention is to provide delivery of lubricant to a plurality of points, the volume of lubricant delivered to said points being varied over a wide range.

Yet another object of this invention is to provide an improved lubricant distributor wherein flowback of undelivered lubricant does not interfere and affect the rate of flow of outgoing lubricant.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWING

For a fuller understanding of the invention, reference is had to the following description taken in connection with the accompanying drawing, in which:

FIGS. 8, 9, 10 and 11 are alternative forms of baffles used to modify flow in the lubricant distributor of this invention;

FIG. 12 is a fragmentary, partially sectional view of an alternate embodiment of the lubricant distributor of this invention;

FIG. 13 is a sectional view taken along line 13—13 of FIG. 12; and

FIGS. 14 and 15 are fragmentary sectional views of two further embodiments of the lubricant distributor of this invention.

DESCRIPTION OF THE PREFERRED EMBODIMENTS

Figure 1:
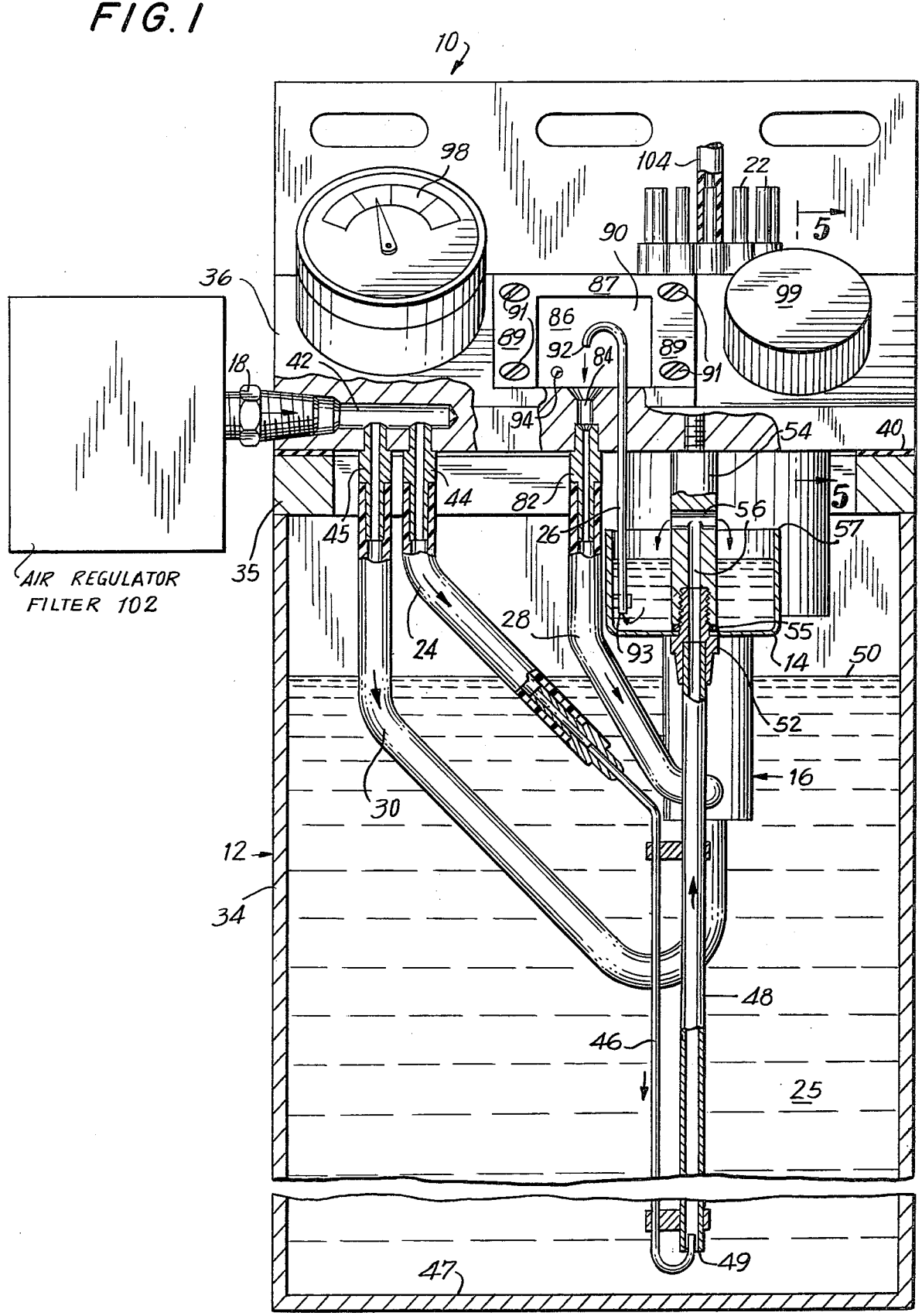
FIG. 1 is an elevational view, partly in section and partly cut away, of the lubricant distributor of this invention.
Figure 2:
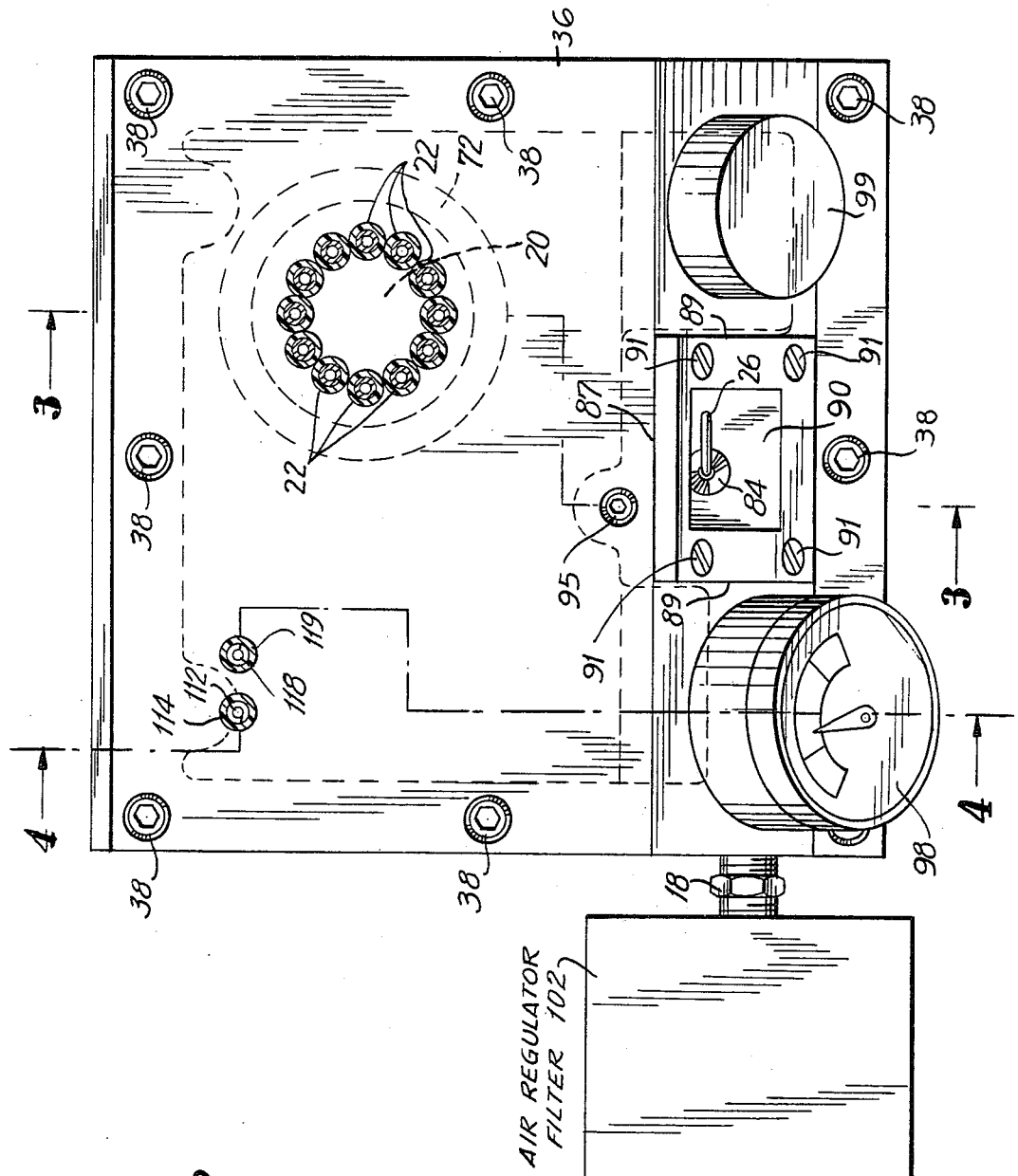
FIG. 2 is a top view of the lubricant distributor of FIG. 1.
Figure 3:
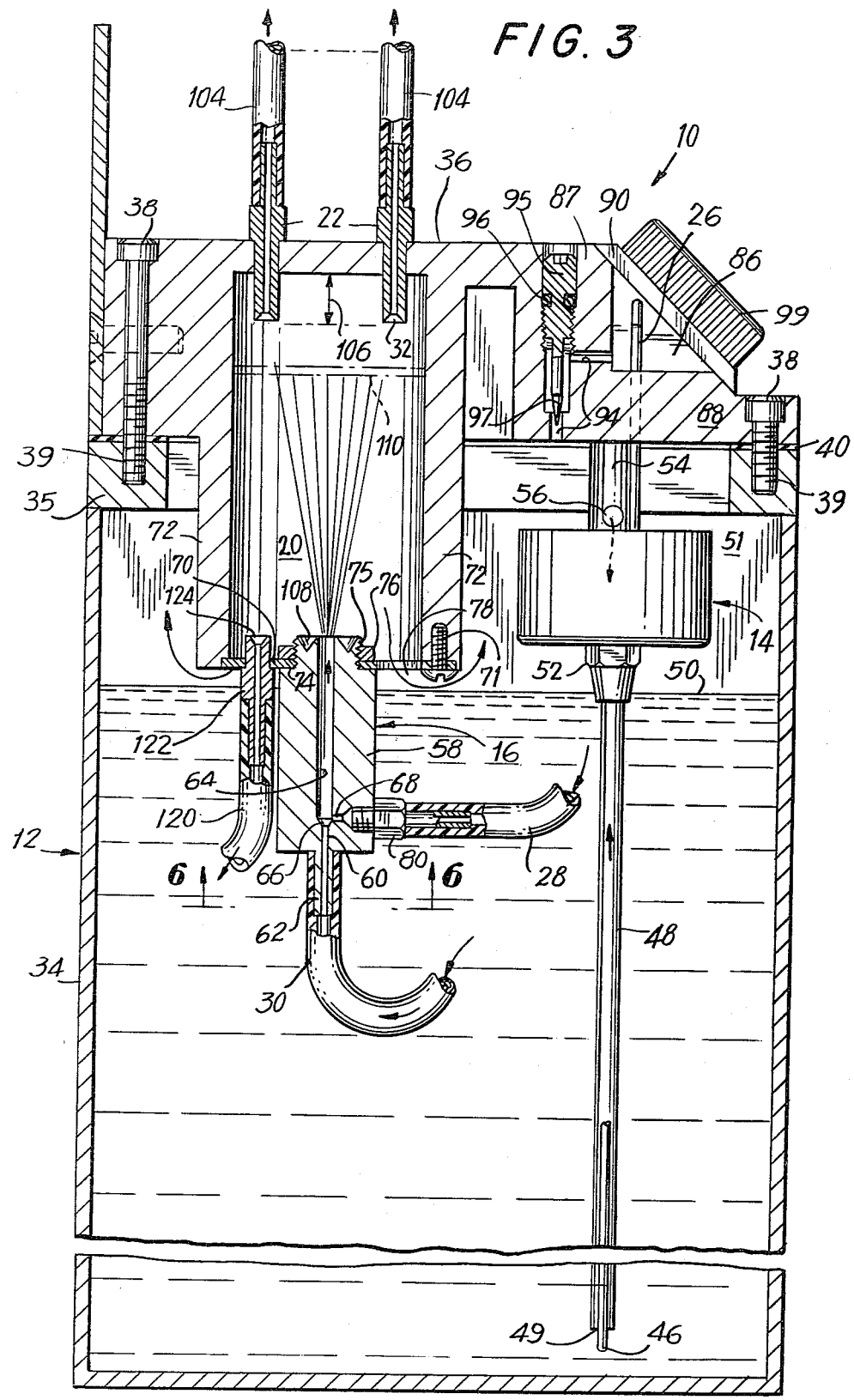
FIG. 3 is a sectional elevational view taken along line 3—3 of FIG. 2.
Figure 4:
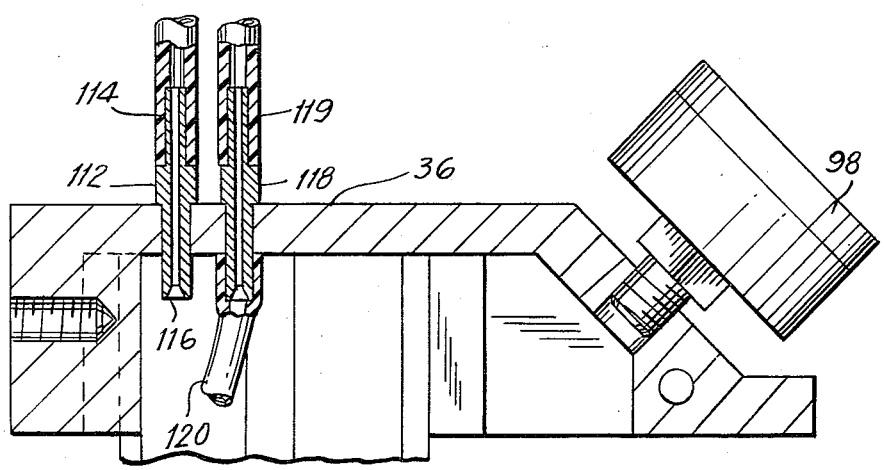
FIG. 4 is a sectional view taken along line 4—4 of FIG. 2.
Figure 5:
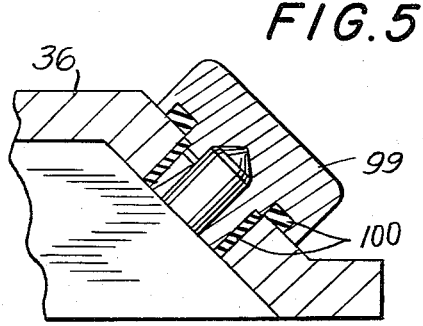
FIG. 5 is a sectional view taken along line 5—5 of FIG. 1.
Figure 6:
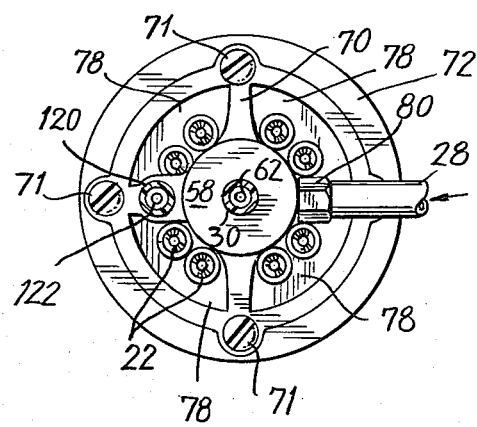
FIG. 6 is a bottom view taken along line 6—6 of FIG. 3.

With reference to FIGS. 1–7, an oil distributor 10 in accordance with this invention is depicted including a primary storage reservoir 12, a secondary oil reservoir 14, an air-jet ejector pump 16 for pumping oil from the secondary oil reservoir 14, and a fitting 18 for the input of pressure-regulated filtered pressurized air. The oil distributor 10 of this invention further includes an expansion chamber 20 which receives the output of the air-jet ejector pump 16 and delivers an air-oil mixture to a plurality of outlet tubes 104.

The supply of pressurized air delivered at the inlet fitting 18 is split into two paths. Tubing 24 (FIG. 1) of the first path drives oil 25 from the primary storage reservoir 12 upwardly into the secondary oil reservoir 14. A drip tube 26 carries oil from the secondary reservoir 14 to the oil inlet tube 28 of the air-jet ejector pump 16. A tubing 30 in the second air-inlet path from the fitting 18 connects to the venturi channel of the air-jet ejector pump 16 and the pressure differential draws oil from the oil-inlet tube 28 into the high-velocity air stream of the venturi. The oil leaves the ejector pump 16 moving upward vertically and outwardly in a conical pattern comprising a mixture of oil droplets of different micron size and air. Inlet nipples or barbs 22 for the outlet tubes 104 are arranged in a circular pattern opposing the jet outlet and receive equal portions of the oil spray emanating from the ejector pump 16. As described more fully hereinafter, the rate of oil flow to the ejector pump 16 and to the outlet tubes 104 is controlled by regulating the pressure differential across the drip tube 26 and by maintaining a constant level of oil in the secondary oil reservoir 14.

A more-detailed description of the oil distributor 10 of this invention follows. The primary storage reservoir 12 includes a hollow, flat-bottomed rectangular cup 34 integrally joined to a peripheral boss 35 along the upper edges. A headpiece 36 rests atop the boss 35 and is fixedly connected thereto by means of bolts 38 of various lengths which pass through the headpiece 36 and engage tapped holes 39 in the boss 35. A gasket 40 is positioned in compression between the headpiece 36 and the boss 35 on the reservoir cup 34, thereby providing a hermetic seal for the primary storage reservoir 12. The air-input fitting 18 connects to an untapped bore hole 42 in the headpiece 36, and transverse nipple fittings 44, 45 connect to the smooth bore hole 42 and extend downward into the cup 34, where the nipple fittings 44, 45 join respectively the tubing 24 of the first air path and tubing 30 of the second air path. Arrows are used in the Figures to indicate the directions of flow through the various tubings of both air and oil separately or in mixture, as explained more fully hereinafter.

The tubing 24 of the first air path is connected to a smaller diameter tubing 46 which extends downward close to the bottom 47 of the primary reservoir 12. The tube 46, at its lower extremity, bends vertically upward and enters the end 49 of an inlet tube 48 connected to the secondary oil reservoir 14. The lower end 49 of the inlet tube 48 is open, and accordingly, in a static state, the tube 48 will be filled with oil to the level 50 existing in the storage reservoir 12.

The secondary oil reservoir 14 is a hollow cylindrical cup open at the top and connected to the oil-inlet tube 48 by means of a nipple fitting 52. The fitting 52 is integrally attached to the inlet tube 48 and protrudes through a central opening in the bottom of the secondary oil reservoir 14. A T-duct 54 is threaded onto the fitting 52 where the fitting 52 extends into the secondary reservoir 14, and a gasket 55 is compressed between the T-duct 54 and the lower surface of the secondary reservoir 14, thereby preventing outleakage of oil from the secondary reservoir 14. Internally, the T-duct 54 has a pair of transverse bores 56 forming a T with a horizontal crossduct. Thus, a continuous flow path is provided from the air-inlet fitting 18, through the tubings 24, 46, 48, the inlet fitting 52 and T-duct 54, such that oil and air are delivered through the horizontal bore 56 in the T-duct 54 and fall into the secondary reservoir 14. The horizontal bore 56 is above the upper edge 57 of the secondary oil reservoir 14, and the entire secondary oil reservoir 14 is elevated above the level 50 of oil 25 in the primary storage reservoir 12 when the reservoir 12 has been filled to its greatest capacity prior to use. Thus, the level of oil in the secondary reservoir 14 is independent of the level of oil in the primary storage reservoir so long as the level of oil in the primary reservoir 12 is sufficient to cover the lower open end 49 of the oil-inlet tube 48 which supplies the secondary reservoir 14. Because the secondary reservoir 14 is open at the top, overflow of oil from the secondary reservoir 14 returns to the primary storage reservoir 12. Thus, with overflow, a constant level of oil can be maintained in the secondary oil reservoir 14, which, as described more fully hereinafter, helps to stabilize the flow rate of oil delivered by the oil distributor 10 of this invention.

The tubing 30 of the second air path carries air from the inlet fitting 18 to the inlet at the bottom of the air-jet ejector pump 16. The primary flow path in the air-jet ejector pump 16 is directed vertically upward and is comprised of a body 58 having a constricted passage 60 extending up from its lower inlet which is connected as an integral nipple 62 to the tubing 30. The vertical outlet from the body 58 is a duct 64 connected to the constricted passage 60 by means of a short, divergent conical section 66 such that a form of venturi tube is formed in the body 58. The air in the inlet tubing 30 accelerates within the constricted passageway 60 and is free to expand at the conical section 66 and in the larger-diameter outlet duct 64. The inlet passage 60 has a high length-to-diameter ratio such that the air flow reaching the conical section 66 is substantially uniform in cross-sectional velocity. The high velocity of the air within the body 58 and at the conical section 66 causes a lowered pressure, which draws oil from the transverse duct 68. The oil enters the outlet duct 64 of the venturi substantially at the intersection of the conical section 66, intermixes with the high-velocity air stream and is carried into the expansion chamber 20. The length-to-diameter ratio of the outlet duct 64 is sufficiently high such that flow, substantially uniform in cross-sectional velocity, discharges into the expansion chamber 20.

In the particular venturi configuration illustrated in the drawing, a length-to-diameter ratio for the passage 64 at least equal to five is preferred. The device performs satisfactorily when the ratio is fourteen. Other venturi configurations designed to produce flows substantially uniform in cross-sectional velocity may be used.

The air-jet ejector pump 16 discharges an oil-air mixture into the expansion chamber 20, which is a hollow cylinder formed within the headpiece 36. The outlet nipples 22, also known as barbs, pass through the upper surface of the headpiece 36 and extend vertically downward into the expansion chamber 20. The circle formed by the outlet nipples 22 is substantially concentric with the venturi outlet duct 64 from the air-ejector pump 16. Because of the substantially concentric arrangement of the outlet nipples 22, the substantially uniform spacing of the nipple inlets 32 from the outlet to duct 64, and the uniform velocity profile at discharge from the duct 64 substantially equal flows of air and oil impinge on the inlet 32 of each outlet nipple 22. In this embodiment, the effect of gravity is equalized relative to each nipple inlet 32 by the vertical orientation of discharge duct 64.

Any droplets emanating from the duct 64, or formed by coalescence during transit through the open gap between the pump 16 and nipples 22, which are too large to be borne in the mixture and fall downward do not affect the rate of flow entering the inlet 32 of any nipple 22. These larger-sized droplets return to the storage reservoir 12.

Further, the length of the gap between the duct 64 outlet and the nipple inlets 32, and the axial position of the inlets 32 are selected to assure a high density of oil impinging on the inlets 32.

A web 70 attaches by means of bolts 71 to the wall 72 which encloses the expansion chamber 20. The body 58 of the ejector pump 16 includes an annular shoulder 74 and a threaded portion 75 which protrudes through a central opening in the web 70. The shoulder 74 limits the extension of the body 58 into the expansion chamber 20 and provides a fixed setting between the duct 64 and nipple inlets 32. The nut 76 engages the threaded portion 75 of the pump body 58 and holds the body 58 in place on the web 70. Oil from the ejector pump 16 which does not enter an outlet nipple 22 returns to the supply in the primary storage reservoir 12 through the openings 78 in the web 70.

Oil reaches the transverse duct 68, proximate the conical portion 66 of the venturi passage, through the fitting 80, oil-inlet tube 28, and flow fitting 82 (FIGS. 1 and 3), which connects to the headpiece 36 and extends downwardly into the primary storage reservoir 12 to receive the tubing 28. A countersunk bore 84 through the headpiece 36 connects a sealed chamber 86 to the flow fitting 82. The sealed chamber 86 is formed of a back wall 87, base 88 (FIG. 3) and two triangular sidewalls 89, integral with the headpiece 36, which are sealingly covered by a transparent window panel 90 held in place by machine screws 91. The countersunk bore 84 and the upper hooked end of the drip tube 26 are also visible through the window panel 90. Note that there is an air gap between the end 92 of the drip tube 26 and the countersunk inlet 84. The drip tube 26 extends from the enclosed sealed chamber 86 through the headpiece 36 and into the secondary oil reservoir 14, where its lower end 93 is submerged beneath the oil therein. A throttled passage 94 (FIG. 3) connects between the sealed chamber 86 and the air and oil-fog space 51 above the oil surface 50.

The needle valve 95 is threaded into the headpiece 36 and an O-ring seal 96 prevents leakage in either direction past the valve 95. The needle point 97 blocks the entrance to the lower portion of the passage 94 and by its position determines how much air or oil fog at the pressure above the oil surface 50 will flow into the sealed chamber 86, which, as described below, is at a lower pressure than the space 51. The gauge 98 senses the pressure of the space 51 within the primary storage reservoir 12 above the oil surface 50. The oil fill cap 99 includes gaskets and seals 100, which maintain hermetic characteristics relative to the outside ambient environment of the primary storage reservoir 12. It should be understood that the regulator 102 feeds air which is filtered and at constant pressure into the oil distributor 10 through input fitting 18. This air leaves the oil distributor 10 only through the outlet tubes 104, which are connected to the outlet nipples 22, and through other outlets which are described later herein.

To operate the oil distributor 10 of this invention, the cap 99 is removed and oil is admitted through the opening to fill the primary storage reservoir 12 to an oil level 50 which is slightly below the web 70 supporting the air-jet ejector pump 16. The fill cap 99 is then replaced in the sealed condition so that a hermetic enclosure is provided comprising the primary storage reservoir 12 and the headpiece 36, sealed and joined as described above. Air under pressure is then supplied at input fitting 18 by means of the regulator 102, which also provides filtration of the inflowing air. Air flowing through the first path, including tubing 24 and tubing 46, is forced up from the bottom 49 of the vertical tube 48, which filled with oil when the reservoir 12 was filled. The mixture of oil and air in tubing 48 discharges through the horizontally transverse openings 56 in the T-duct 54, and the oil falls into the secondary oil reservoir 14 and in time fills the reservoir 14 to the point of overflow over the upper edge 57. Overflow oil returns to the pool of oil in the reservoir 12.

At start-up, a second stream of air passes simultaneously through the second path, including the tubing 30, and enters the venturi ducts 60, 66, 64 of the air-jet ejector pump 16. At the outset, only air emerges from the ejector pump 16. However, within the venturi ducts, a reduced pressure exists, which draws air from the sealed chamber 86 through flow fitting 82, tubing 28, fitting 80 and into the main air stream within the venturi ducts. Withdrawal of air from the sealed chamber 86 lowers the pressure within that chamber and causes, at first, air to flow upward through the drip tube 26 and into the chamber 86. Once the level of oil in the secondary oil reservoir 14 is sufficient to cover the lower inlet 93 of the drip tube 26, only oil is drawn up through the drip tube 26. The oil enters the sealed chamber 86, where it drops from the tube outlet 92 downward into the countersunk opening 84 leading to the transverse duct 68 in the air-jet ejector pump 16. Depending upon the pressure differential in the sealed chamber 86 relative to the air space 51 in the reservoir 12, the flow from the drip tube 26 is in the form of individual droplets for low pressure differentials and ranges up to a continuous stream at high pressure differentials. Generally, dropwise operation is used. The number of drops per minute or per half-minute may be observed and counted through the transparent window panel 90, and the flow rate may be regulated by altering the pressure in the sealed chamber 86 by means of the needle valve 95. The pressure in the chamber 86 increases as the needle valve 95 is opened. The rate of droplet flow from the drip tube 26 is indicative of, but is not an accurate measure of, the instantaneous flow of oil from the air-jet ejector pump 16. The drip tube 26 is dimensioned to be the limiting flow factor such that oil never collects in the sealed chamber 86.

The oil leaving the tubing 28 and entering the venturi 10 is entrapped in the air and emerges from the vertical venturi outlet duct 64 in a stream which is substantially uniform in its cross-sectional velocity profile and distribution of droplet sizes, which vary over a wide range. The uniform stream of oil and air spreads conically as it moves upward until it impinges on the inlets 32 of the outlet nipples 22. Because of the uniform flow at the outlet from the air-jet ejector pump 16, the symmetrical arrangement and vertical discharge from duct 64, as discussed above, the amount of oil which enters each tube 104 is substantially equal within a narrow range of variation. The airborne oil entering the nipples 22 includes oil particles so small as to be a fog, as well as many discrete droplets small enough to be suspended in the moving air-stream.

Oil in the widening cone leaving the jet pump 16 which does not enter the tube nipples 22 forms a fog which fills the space 51 above the reservoir and a film which slides down the walls of the expansion chamber 20 and returns to the oil supply 25 in the primary storage reservoir 12 by passing through the openings 78 in the web 70. Note that the nipples 22 extend a distance 106 below the upper surface of the expansion chamber 20 such that substantially none of the oil film which collects on the inner surfaces of the expansion chamber 20 enters the inlet 32 of any nipple 22 to disturb the uniform distribution of flow which supplies each tube 104. Also note that the discharge end of venturi duct 64 is elevated above the web 70 so that any film or pooling of oil collecting on the web will not interfere with the discharge, or be entrained in the discharge stream, from the ejector pump 16. A V-shaped annular channel 108 surrounds the outlet opening of the duct 64 to prevent the formation of oil droplets at the point of discharge. The application of such a channel 108 to a nozzle is known in the art of nozzle design and is disclosed in U.S. Pat. No. 3,726,482.

Figure 8:
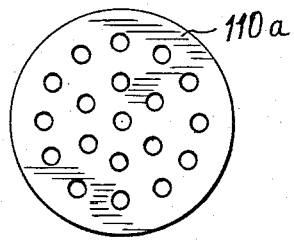
Figure 9:
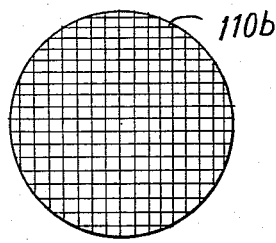
Figure 10:
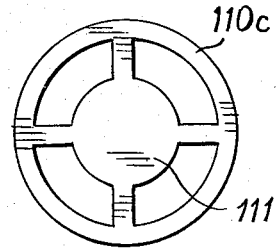

The rate of flow of oil and air to the inlet nipples 22 is controlled by the pressure in the sealed chamber 86 as described above. Also, the amount of oil and air flow to the nipples 22 can be modified in alternative embodiments by the addition of a baffle plate, indicated with broken lines in FIG. 3 and identified by the reference numeral 110, which is positioned transversely in the expansion chamber 20 in the path of the stream discharged from the jet ejector pump 16. FIG. 8 illustrates a baffle plate 110a comprising a perforated disk. FIG. 9 illustrates a baffle plate 110b which is comprised of wire screening having a uniform distribution of transverse wires. FIG. 10 illustrates a baffle plate 110c in the form of a web with a solid circular disk 111 at its center. FIG. 11 illustrates a baffle plate 110d in the form of a web one-half of which defines a semi-circular opening 112, the other half of which commenses a perforated plate 113.

While the stream of oil and air emerging from the ejector pump 16 is cross-sectionally uniform in composition, it can be pulsating in rate because of the dropwise input of oil in the enclosure 86. Also, the instantaneous reception rate of oil and air at the inlets 32 of the nipples 22 is not a constant value, although average values are substantially constant for particular settings of air supply pressure and pressure within the sealed chamber 86. The upward flow of air through the tubing 48 fills the secondary oil reservoir 14 to overflowing such that the flow through the drip tube 26 is unaffected by the varying level of liquid in the primary reservoir 12.

Figure 7:
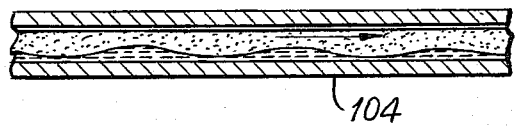
FIG. 7 is a sectional view of a tube delivering oil from the lubricant distributor of this invention.

FIG. 7 illustrates a portion of an outlet tube 104 in cross section, showing an air-oil flow therein. The oil-air mixture impacting on the inlet 32 of the nipple 22 connected to the tube 104 is a mixture containing oil particles ranging from the lowest micron sizes, which are substantially invisible and form a fog, up to droplets visible in the stream. Within the tubing 104, the oil can, all or in part, form a film on the wall, or in part remain as a fog which travels through the tubing 104, or in part coalesce to form attached droplets or waves of varying sizes which ride at the bottom of the tubes. The droplets are carried along the flow of mixture passing through the tube. Whereas, as described above, there can be a pulsating input rate at the nipple 22, the tubing 104 levels out the variations, and at the end of the tubes 104, there is delivered a substantially even flow of oil. Each delivery tube 104 is terminated in a nozzle, for example, such as described in the above-mentioned U.S. Pat. No. 3,726,482, which serves to even the flow and discharge of the oil in the form required. The terminating nozzle is not a novel portion of this invention and therefore is not described in any detail herein.

The oil distributor 10 of this invention is an improvement over the prior art in that it provides substantially equal oil flow at a plurality of lubrication points, and the oil flow rates are adjustable over a wide range. As stated above, the uniform flow rate in the plurality of tubes 104 results from the uniform spacing of the nipples 22 relative to the outlet of the ejector pump 16. Secondarily, the uniformity results from the spacing 106 of the inlet 32 from the upper inner wall of the expansion chamber 20, which prevents oil which coalesces on the wall surfaces from entering or blocking any of the nipple inlets 32. Partial obstruction of an inlet 32 will disturb the pattern of flow into the inlet, degrading both uniformity of oil distribution and volume in that inlet. Also, spacing of the discharge opening of the duct 64 above the web 70 prevents oil running down the walls of the expansion chamber 20 from interfering with the pattern and quantity of flow from the ejector pump 16. Further, the annular groove 108 around the discharge duct 64 prevents nozzle dripping, which could affect the flow rate and distribution from the ejector pump 16.

Oil in the expansion chamber 20 which does not enter the nipples 22 impinges on the walls of the expansion chamber 20 and returns by gravity to the main storage reservoir 12 by passing through the openings 78 in the web 70. Thus, there is no accumulation of oil in the expansion chamber which can affect either the jet pump outlet or the inlets 32 to the nipples 22.

Pressure levels within the distributor 10, as stated above, determine the quantity of oil which is distributed to points requiring lubrication. Higher air-inlet pressures at the inlet fitting 18 result in generally high velocity through the venturi ducts. This in turn draws more oil from the tubing 28 and reduces the pressure in the enclosed chamber 86. The air flow to the inlet tube 48 of the secondary oil reservoir 14 is sufficient to maintain an overflow condition from that reservoir at all times.

Thus, the output of the drip tube 26 depends primarily on the pressure in the sealed chamber 86. Should the secondary reservoir 14 not be in an overflowing condition, the flow through the drip tube 26 is only affected in a secondary manner so long as the lower inlet 93 of the drip tube 26 is submerged beneath the oil.

Above the liquid level 50 is a suspended fog of air and micron-sized oil droplets. An auxiliary tap (FIG. 4) comprising a nipple 112 connected to a tubing 114 passes through the headpiece 36 and has its inlet 116 located in the fog above the oil level 50. The pressure in the space 51 above the oil level 50 causes fog to flow through the auxiliary outlet tube 114 to a point requiring light lubrication. It should be understood that a plurality of such auxiliary tubes may be provided. The oil flow from this auxiliary tube 114 is substantially less than the oil flow in the tubes 104 resulting from the direct impact of the oil-air mixture emanating from the air-jet ejector pump 16.

A second auxiliary tap comprises nipple 118 connected to tubing 119 for delivery of oil to a remote point requiring lubrication. Internal tubing 120 connects from the nipple 118 (FIG. 4) to the nipple 122, which is attached to the web 70 (FIG. 3), and extends upward into the expansion chamber 20. The inlet 124 to the nipple 122 admits entrance of both fog and droplets of oil too large to be sustained by the air flow in the conical stream emanating from the jet ejector pump 16. The inlet 124 to the nipple 122 is raised above the web 70 so that liquid collecting on the web does not enter the auxiliary outlet but rather falls through the openings 78 in the web 70 and returns to the reservoir 12. The auxiliary outlet tube 119 connected to the web 70 provides a lubricant flow rate which is intermediate that rate provided by the auxiliary outlet 114 carrying only fog and the outlet tubes 104 carrying the output from the ejector pump 16. It should be apparent that more than one outlet may be connected to the web 70.

In an embodiment of this invention which performed satisfactorily, the flow rate was varied over a range from 0.4 cc per hour for a delivery tube 104 to 40 cc per hour for a delivery tube 104. In mid-range, equality in distribution of flow among the tubes 104 was in a range of ±5 to ±10% of the average flow per tube, and at the extremes of the flow range, equality in distribution of flow was in a range of ±13%. An oil distributor with as few as four and as many as twelve tubes 104 performed with these characteristics.

The embodiment of FIGS. 1–6 relies principally on the pressure differential between chamber 86 and air space 51 of reservoir 12, as regulated by needle valve 95, to control the volume of oil delivered to the respective outlet nipples 22. In an alternate embodiment, a gravity feed from a secondary reservoir positioned above the level of transverse duct 68 may be utilized. The secondary reservoir could be fed by a bubble pump from the main reservoir with uniform pressure being maintained by over flow from the secondary oil reservoir to keep the secondary reservoir at a uniform pressure head. Flow of oil from the secondary reservoir to the venturi could be controlled by a conventional needle valve controlling the size of the passage between the secondary oil reservoir and transverse duct 68. A run-off port may be provided between the valve and the transverse duct 68 to permit run-off of oil into the main reservoir when the pressurized air is cut off from the venturi.

While a symmetrical arrangement of nipples 22 around the axis defined by the outlets of duct 64 is depicted, such a symmetrical alignment is not required, so long as the nipples which are to receive substantially equal flows of oil are positioned with their respective inlets 32 spaced a substantially equal distance from the axis of duct 64 and with their respective inlets spaced a substantially equal distance from the outlet of duct 64. Thus, by way of example, if all but four adjacent nipples 22 were blocked or removed, substantially uniform flow over a wide range of oil volume would be obtained through the remaining four nipples.

While a preferred embodiment of FIGS. 1–6 is characterized by the essentially vertical upward discharge of the air-oil stream from the outlet of duct 64 toward the downwardly facing inlets 32 of nipples 22, other orientations of the duct and nipples may be utilized in accordance with the invention. By way of example, reference is had to FIGS. 12 and 13, which depict an alternate embodiment of the lubricant distributor in accordance with the invention. Specifically, an air-jet ejector pump 16' is mounted on a frame 130 with its outlet duct 64' facing substantially vertically downwardly, and is held in position by a nut 76' engaging the threaded portion 75' of pump body 58'. Oil is delivered to the air-jet ejector pump 16' through oil-inlet tube 28' and fitting 80' while air is delivered to said air-jet ejector pump through tubing 30' and nipple 62', both in the same manner as oil and air are delivered to the air-jet ejector pump 16 of the embodiment of FIGS. 1–6. Frame 130 would be mounted over a main reservoir of oil and would also support four rods 121 which project downwardly from frame 130 and which in turn support, at their lower ends, a web 132. Rods 121 are secured to frame 130 by screws 123 and to web 132 by screws 124. Web 132 supports a plurality of nipples 22' positioned with their inlets 32' facing and in the path of the conical air-oil stream projected from the outlet of duct 64'. Nipples 22' are mounted so that the ends thereof supporting inlets 32' project upwardly from the upper surface of web 132 so that oil not directly impinging on inlets 32' does not interfere with the direct flow of oil into said inlets. Rather, the excess oil flows off web 132 through apertures 125 formed therein and over the outer peripheral rim of said web, all of such excess oil falling into the main reservoir. The air-oil stream which enters each nipple 22' passes through a tube 126 to an exit nipple 127 mounted on a headpiece 36'. One exit nipple 127 would be provided for each nipple 22', the exit nipples being arranged in any desired orientation on headpiece 36', substantially equal flows of oil passing through each exit nipple to a corresponding tube 104' for transmission to the point requiring lubrication.

Nozzle inlets 32' are preferably positioned substantially in a circle concentric with the axis of duct 64' and substantially equally spaced from the outlet of duct 64'. The positioning of nozzle inlets 32' is selected for location in the region of maximum density of flow in the essentially hollow-conical air-oil stream. Other rates of oil flow can be obtained from nipples 128 and 129 also mounted on web 132. Centrally mounted nipple 128 receives the lowest level of oil delivery. Nipples 129, positioned intermediate nipples 128 and 22', would receive an intermediate level of spray. Each nipple 128 and 129 is connected to an exit nipple 127 by a tube 126.

Other orientations of the duct outlet and nipple inlet may be utilized provided that excess oil does not interfere with the flow of oil into the nipple inlets and further provided that, where essentially uniform flow in two or more nipples is required, the nipples are positioned to receive substantially uniform flows of oil ejected from the duct outlet across the gap. While the nozzle arrangement depicted produces a hollow conical spray, other spray configurations can be produced resulting in different nipple orientations.

Referring now to FIG. 14, an alternate embodiment of the air-jet ejector pump and expansion chamber in accordance with the invention is depicted, like reference numerals as were used in prior embodiments being applied to like elements. In this embodiment, expansion chamber 140 is defined by a housing 142 free of openings other than those described below. A plurality of nipples 22 having inlet openings 32' are mounted in the top wall of housing 142 in an essentially circular array, with the inlet openings 32' projecting into expansion chamber 140 so as to prevent interference between excess lubricant and the flow into the inlet openings 32', as described above. The bottom wall of the housing 142 is formed with an annular trough 144 about the outer periphery thereof for receiving the excess lubricant from the essentially conical lubricant spray which does not enter inlet openings 32'. Such excess lubricant may either fall directly into the trough 144 or run along the side peripheral walls into said trough. The air-jet ejector pump 146 includes an air inlet 148 which receives air under pressure transmitted in the direction of arrow 150 from tubing 152. The air passes from a constricted passage 154 to duct 156 through a short conical section 158. Oil is fed to the venturi thus formed from an outlet duct 160 and intermixes with the high-velocity air stream in duct 156. The oil may be fed from an oil supply 162 through tubing 164. The oil supply may consist of any known metering system, including mechanical, electrical, hydraulic or pneumatic devices, the oil-metering arrangement of the embodiment of FIGS. 1-7 not being required. From duct 156, the air-oil stream enters a preliminary expansion chamber 166 of greater diameter than duct 156 but of substantially lesser diameter than expansion chamber 140, and from the preliminary expansion chamber, located centrally of the bottom wall of housing 142, outlet opening 168 projects an essentially conical stream of lubricant to the inlet openings 32' of nipples 22.

It has been found that the preliminary expansion chamber 166 aids in the formation of an essentially uniform conical spray, further enhancing the uniformity of feed to the respective nipples 22 without regard to the location thereof. The excess lubricant from expansion chamber 140 passes from trough 144 through duct 170 to the base of preliminary expansion chamber 166 adjacent the short conical section 172 communicating between duct 156 and preliminary expansion chamber 166. Either section of duct 170 and preliminary expansion chamber 166 serves as a further venturi, entraining the excess lubricant into the main lubrication stream. In this manner, excess lubricant is recycled rather than being returned to the main oil reservoir.

The foregoing arrangement is particularly useful where the oil includes cleaning agents such as detergents. Such oil, when aerated and returned to the main reservoir, tends to foam, interfering with the operation of the lubricant distributor in accordance with the invention. This defect is remedied by the arrangement of FIG. 14, since the small quantities of aerated lubricant are immediately recycled, preventing foam buildup.

Referring now to FIG. 15, still a further alternative embodiment of the air-jet ejector pump and expansion chamber in accordance with the invention is depicted, like reference numerals being applied to like elements. In this embodiment, air-jet ejector pump 180 is of similar design to pump 16 of FIGS. 1-7, with tubing 30 delivering air under pressure to nipple 62 and tubing 28 delivering oil to a fitting 80'. In the embodiment of FIG. 15, duct 182, leading from the air inlet past the transverse oil delivery duct 68', is essentially identical to elements 154, 156 and 158 of FIG. 14 and is coupled by a short conical section 183 to a preliminary expansion chamber 184 similar to preliminary expansion chamber 166 of FIG. 14, which preliminary expansion chamber has been found to provide a more-uniform conical lubricant stream at outlet 186. Expansion chamber 188 is defined by a housing 190 secured to headpiece 36' by screws 192, which engage tabs 194 secured to housing 190. Nipples 22 pass through openings in headpiece 36' so that the inlet openings thereof project into expansion chamber 188 as described above. The upper peripheral region of housing 190 is formed with notches 196 which provide communication with the exterior of the housing and therefore to the main oil reservoir (not shown). Such notch openings 196 provide a path for the flow of excess lubricant out of the expansion chamber. In addition, the bottom wall of the expansion chamber is formed with a plurality of openings 198 which serve to permit the escape of excess lubricant, which falls to the bottom of the chamber. In other respects, the embodiment of FIG. 15 operates in the same manner as the embodiment of FIGS. 1-7.

Further, while a venturi-type oil-jet pump is illustrated, other sources of oil under pressure may be utilized, including pressurized oil streams broken up by air or mechanical means.

While examples of the apparatus above use oil as a lubricant, other liquid or colloidal suspension lubricants can be used provided they are capable of delivery by spraying.

It will thus be seen that the objects set forth above, and those made apparent from the preceding description, are efficiently attained, and since certain changes may be made in the above contructions without departing from the spirit and scope of the invention, it is intended that all matter contained in the above description or shown in the accompanying drawings shall be interpreted as illustrative and not in a limitng sense.

It is also to be understood that the following claims are intended to cover all of the generic and specific features of the invention herein described and all statements of the scope of the invention which, as a matter of language, might be said to fall therebetween.

We claim:

1. A distributor for feeding a lubricant comprising:
lubricant supply means having an outlet;
lubricant transmission means having an inlet spaced from said outlet by a gap, said lubricant supply means being adapted to project a pressurized lubricant stream from said outlet across said gap; and
means supporting said lubricant transmission means inlet so that said transmission means inlet faces and is at least in part in the path of at least a portion of the lubricant stream, the lubricant transmission means inlet projecting toward said lubricant supply means from the adjacent surface of said support means, whereby flow to said inlet of lubricant not directly impinging on said inlet is substantially limited and interference of the direct flow of at least a portion of the lubricant stream into the lubricant transmission means inlet by lubricant from said stream not directly impinging on said inlet is substantially limited.

2. A distributor as claimed in claim 1, wherein said support means is shaped to permit the passage therepast of lubricant from said lubricant stream not directly impinging on said lubricant transmission means inlet.

3. A distributor as claimed in claim 1, wherein at least a path of said lubricant stream between said lubricant supply means outlet and said lubricant transmission means inlet is free of constraints.

4. A distributor as claimed in claim 1, wherein said lubricant supply means includes means for producing a gas-lubricant stream having a velocity and direction such that at least a portion of said stream flows across said gap and enters said lubricant transmission means inlet.

5. A distributor as claimed in claim 1, wherein said lubricant transmission means is adapted to produce a lubricant stream having at least two regions characterized by substantially equal lubricant flow, and including at least two lubricant transmission means inlets, one transmission means inlet being positioned in the path of one of said regions of substantially equal lubricant flow, whereby substantially equal rates of lubricant flow enter each of said at least two lubricant transmission means inlets.

6. A distributor as claimed in claim 1, wherein said lubricant supply means outlet faces upwardly and said lubricant transmission means inlet faces downwardly.

7. A distributor for feeding a lubricant comprising: lubricant supply means having an outlet; lubricant transmission means having an inlet spaced from said outlet by a gap, said lubricant supply means being adapted to project a pressurized lubricant stream from said outlet across said gap; and means supporting said lubricant transmissions means inlet so that said transmission means inlet faces and is at least in part in the path of at least a portion of the lubricant stream, said support means being shaped to permit the passage therepast of lubricant from said lubricant stream not directly impinging on said lubricant transmission means inlet, whereby interference of the direct flow of at least a portion of the lubricant stream into the lubricant transmission means inlet by lubricant from said stream not directly impinging on said inlet is substantially limited.

8. A distributor as claimed in claim 7 or 2, wherein said support means is formed with apertures therethrough for the passage of lubricant from said lubricant stream therethrough.

9. A distributor as claimed in claim 1 or 7, wherein said gap is defined by an expansion chamber at least intermediate said lubrication supply means outlet and said support means.

10. A distributor as claimed in claim 9, wherein said expansion chamber includes openings in the region adjacent to said support means for the passage of at least a portion of the lubricant from said stream not directly impinging on said inlet to a location outside of said chamber.

11. A distributor as claimed in claim 10, wherein said lubricant supply means includes a lubricant reservoir, said expansion chamber openings communicating with said lubricant reservoir for the passage of at least a portion of said lubricant from said stream not directly impinging on said inlet to said reservoir.

12. A distributor as claimed in claim 9, wherein said lubricant supply means includes lubricant source means and lubricant stream-forming means intermediate said outlet and said lubricant source means, duct means communicating from the bottom of said expansion chamber to said lubricant stream-forming means for the recycling of lubricant from said stream not directly impinging on said inlet, said expansion chamber otherwise essentially preventing the flow of said lubricant not directly impinging on said inlet from escaping from said expansion chamber.

13. A distributor as claimed in claim 12, wherein said outlet is defined by a projection into said expansion chamber, the bottom of said expansion chamber defining a trough for guiding said lubricant from said stream not directly impinging on said inlet to said duct means.

14. A distributor for feeding a lubricant comprising:
lubricant supply means having an outlet facing in a first direction;
at least two lubricant transmission means, each having an inlet spaced from said outlet by a gap and facing in a second direction essentially opposite to said first direction, said lubricant supply means being adapted to project a pressurized lubricant stream from said outlet across said gap, said lubricant stream being characterized by at least two regions of substantially uniform lubricant flow; and
means supporting said lubricant transmission means inlets so that said at least two inlets are each positioned in one of said regions of said lubricant stream, whereby rate of flow of lubricant into said at least two inlets is substantially uniform.

15. A distributor as claimed in claim 14, wherein at least a path of said lubricant stream between said lubricant supply means outlet and said lubricant transmission means inlet is free of constraints.

16. A distributor as claimed in claim 14, wherein said lubricant supply means includes means for producing a gas-lubricant stream having a velocity and direction such that at least a portion of said stream flows across said gap and enters said lubricant transmission means inlet.

17. A distributor as claimed in claim 14, wherein said lubricant supply means outlet faces upwardly and said at least two lubricant transmission means inlets face downwardly.

18. A distributor for feeding a lubricant comprising:
lubricant supply means having an outlet;
lubricant transmission means having at least two inlets spaced from said outlet by a gap, said lubricant supply means being positioned and adapted to project a pressurized lubricant stream from said outlet in an upward direction across said gap; and
means supporting said at least two lubricant transmission means inlets so that each of said transmission means inlets face and are at least in part in the path of at least a portion of the lubricant stream, and so that said lubricant transmission means inlets face downwardly.

19. A distributor as claimed in claim 18, wherein said lubricant supply means includes means for producing a gas-lubricant stream having a velocity and direction such that at least a portion of said stream flows across said gap and enters said lubricant transmission means inlets.

20. A distributor as claimed in claim 18, and further comprising means for supporting said lubricant supply means outlet so that lubricant from said lubricant stream not directly impinging on said lubricant transmission means inlet may flow therepast without substantially interfering with the flow of lubricant from said outlet.

21. A distributor as claimed in claim 18, and further comprising a chamber, said at least two lubricant supply means inlets being within said chamber, the lubricant stream flowing upwardly through said chamber, said chamber having an opening at the bottom thereof for drainage of lubricant not entering said lubricant transmission means inlets.

22. A distributor as claimed in claim 21, said chamber further including at least one opening at the upper periphery thereof for permitting the passage of lubricant not entering said lubricant transmission means inlet to a location outside of said chamber.

23. A distributor as claimed in claim 18, wherein said lubricant supply means is adapted to produce a lubricant stream having at least two regions characterized by substantially equal lubricant flow, one of said at least two transmission means inlets being positioned in the path of each of said regions of substantially equal lubricant flow, whereby substantially equal rates of lubricant flow enter each of said at least two lubricant transmission means inlets.

24. A distributor as claimed in claim 5, 14 or 23, wherein said lubricant supply means outlet defines a nozzle outlet and wherein said at least two lubricant transmission means inlets are respectively positioned at substantially equal distances from said outlet.

25. A distributor as claimed in claim 1, 5, 14, 18 or 23, wherein each of said lubricant transmission means inlets is positioned in the path of a portion of said lubricant stream characterized by high-density flow of lubricant from said duct outlet.

26. A distributor as claimed in claim 5, 14 or 23, wherein said lubricant supply means outlet is adapted to produce an essentially conical lubricant stream, and wherein said at least two lubricant transmission means inlets are respectively positioned at substantially equal distances from the axis of said conical stream and at substantially equal distances from said outlet.

27. A distributor as claimed in claim 5, 14 or 23, and including at least one additional inlet positioned outside of said regions of substantially uniform lubricant flow for providing a rate of flow different from said first-mentioned nozzles.

28. A distributor as claimed in claim 1, 5, 14, 18 or 23, and further comprising a baffle in the gap between said outlet and said inlets, whereby the flow rate of lubricant in said stream entering said inlets is modified.

29. A distributor as claimed in claim 28, wherein said baffle includes at least a portion selected from the group including a cross-wire screen, a perforated disk and a web.

30. A distributor as claimed in claim 18, wherein at least a path of said lubricant stream between said lubricant supply means outlet and said lubricant transmission means inlets is free of constraints.

31. A distributor as claimed in claim 1, 3, 14, 15, 18 or 30, wherein said lubricant supply means includes a duct having an inlet and an outlet;
means for causing a gas to flow through said duct from said duct inlet to said duct outlet; and
means for feeding a liquid lubricant into said duct at a location intermediate said duct inlet and said duct outlet, whereby a mixture of said gas and liquid is produced in said duct, said mixture discharging from said duct outlet.

32. A distributor as claimed in claim 31, wherein said duct outlet communicates with a preliminary expansion chamber of a diameter greater than said duct, said preliminary expansion chamber communicating to said lubrication supply means outlet.

33. A distributor as claimed in claim 32, including a further expansion chamber surrounding said gap and having duct means communicating from a bottom of said further expansion chamber to said preliminary expansion chamber for the entraining of lubricant from the lubricant stream not directly impinging on the lubricant transmission means inlet back into the lubricant stream, said further expansion chamber otherwise essentially preventing the passage of said lubricant from said lubricant stream not directly impinging on a lubricant transmission means inlet to a location outside of said further expansion chamber.

34. A distributor as claimed in claim 31, wherein said duct is constricted, causing said gas to move at high velocity and reduced pressure in said duct, and said means for feeding a liquid lubricant includes a passage for lubricant, said passage discharge end being connected at said intermediate location and exposed to said reduced pressure, whereby lubricant leaves said passage and intermixes with said high-velocity gas flow.

35. A distributor as claimed in claim 34, and further comprising means for controlling the pressure at the inlet end of said lubricant passage, whereby the rate of feeding lubricant to said high-velocity gas stream through said passage is regulated.

36. A distributor as claimed in claim 35, and further comprising:
a lubricant storage reservoir, said means for feeding lubricant further including means for drawing lubricant from said reservoir and delivering lubricant to said inlet to said lubricant passage, and
a headpiece, said headpiece and reservoir being joined to form a hermetic container, said container including said chamber, said means for feeding and said means for controlling the pressure at the inlet end of said lubricant passage.

37. A distributor as claimed in claim 35, wherein said means for feeding a liquid lubricant further includes a secondary reservoir, means for supplying lubricant from said primary reservoir to said secondary reservoir while maintaining said lubricant at a constant level and means for supplying lubricant from said secondary reservoir to said duct.

38. A distributor as claimed in claim 35, wherein a plurality of said lubricant transmission means inlets are provided arranged on a circle, said circle being coaxially aligned with said outlet.

39. A distributor as claimed in claim 35, wherein said duct includes two colinear duct portions, the diameter of said portion at the inlet being less than the diameter of said portion at the outlet of said duct, said intermediate location for feeding said lubricant being proximate the connection between said first and second duct portions.

40. A distributor as claimed in claim 39, wherein the length-to-diameter ratio of said duct portion at the outlet is at least five.

41. A distributor as claimed in claim 39, wherein the length-to-diameter ratio of said duct portion at the outlet is about fourteen.

* * * * *